(12) United States Patent
Kataoka et al.

(10) Patent No.: US 7,524,892 B2
(45) Date of Patent: Apr. 28, 2009

(54) PIGMENT DISPERSION AND INK COMPOSITION AND INK SET BOTH CONTAINING THE SAME

(75) Inventors: Shuichi Kataoka, Nagano-ken (JP);
Bunji Ishimoto, Nagano-ken (JP);
Akira Mizutani, Nagano-ken (JP);
Naoki Okamoto, Hyogo-ken (JP);
Yoshiaki Miyazaki, Hyogo-ken (JP);
Izumi Yasuda, Hyogo-ken (JP);
Tomoyuki Shiraga, Hyogo-ken (JP)

(73) Assignees: Seiko Epson Corporation, Tokyo (JP);
Mikuni Shikiso Kabushiki Kaisha, Hyogo (JP)

( * ) Notice: Subject to any disclaimer, the term of this patent is extended or adjusted under 35 U.S.C. 154(b) by 592 days.

(21) Appl. No.: 10/516,573

(22) PCT Filed: Apr. 12, 2004

(86) PCT No.: PCT/JP2004/005216

§ 371 (c)(1),
(2), (4) Date: May 19, 2005

(87) PCT Pub. No.: WO2004/092285

PCT Pub. Date: Oct. 28, 2004

(65) Prior Publication Data

US 2005/0228069 A1    Oct. 13, 2005

(30) Foreign Application Priority Data

Apr. 11, 2003  (JP) .............................. 2003-108453
Apr. 11, 2003  (JP) .............................. 2003-108456
Apr. 11, 2003  (JP) .............................. 2003-108458

(51) Int. Cl.
*C09D 11/00*  (2006.01)

(52) U.S. Cl. ..................................... 523/160; 523/161

(58) Field of Classification Search ................ 523/160, 523/161
See application file for complete search history.

(56) References Cited

U.S. PATENT DOCUMENTS 5,696,182 A     12/1997  Kashiwazaki et al.
6,877,851 B2 *  4/2005   Watanabe ................... 347/100

FOREIGN PATENT DOCUMENTS

| JP | 2000-239392 | 9/2000 |
| JP | 2001-348518 | 12/2001 |
| JP | 2002-167536 | 6/2002 |
| JP | 2003-034071 | 2/2003 |
| JP | 2003-213164 | 7/2003 |

OTHER PUBLICATIONS

Patent Abstracts of Japan and JPO computer translation of JP 2000-239392 dated Sep. 5, 2000.
Patent Abstracts of Japan and JPO computer translation of JP 2002-167536 dated Jun. 11, 2002.
Patent Abstracts of Japan and JPO computer translation of JP 2001-348518 dated Dec. 18, 2001.
Patent Abstracts of Japan and JPO computer translation of JP 2003-034071 dated Feb. 4, 2003.
Patent Abstracts of Japan and JPO computer translation of JP 2003-213164 dated Jul. 30, 2003.

* cited by examiner

*Primary Examiner*—Edward J Cain
(74) *Attorney, Agent, or Firm*—Ladas and Parry LLP

(57) ABSTRACT

It is an object of the present invention to provide a pigment dispersion, an ink composition, and an ink set, enabling excellent glossiness, bronzing prevention, and ink composition storage stability to be realized. The present invention provides a pigment dispersion characterized by comprising at least a pigment, an aqueous medium, a copolymer resin between a hydrophobic monomer and a hydrophilic monomer, and a urethane resin, and also an ink composition characterized by containing at least the pigment dispersion and an aqueous medium, and an ink set characterized by comprising at least the ink composition.

33 Claims, No Drawings

PIGMENT DISPERSION AND INK COMPOSITION AND INK SET BOTH CONTAINING THE SAME

CROSS-REFERENCES

The present invention relates to a pigment dispersion that enables excellent glossiness of recorded images, prevention of bronzing, and good ink composition storage stability to be realized, and an ink composition containing the pigment dispersion and an ink set containing the ink composition, and in particular relates to a pigment dispersion that enables excellent glossiness of color images, prevention of bronzing, and good ink composition storage stability to be realized, and an ink composition containing the pigment dispersion and an ink set containing the ink composition.

BACKGROUND

From hitherto, many pigments have been used as colorants for ink jet recording inks and writing instrument inks, this being because pigments are excellent in terms of water resistance, light-fastness and durability. Pigments are not soluble in water, and hence in the case of use in an ink composition, it is important for a pigment to be stably dispersed in water in the form of minute particles. From the viewpoint of making the pigment readily wettable by water, preventing settling of the pigment and so on, such an ink composition having a pigment as a colorant is generally manufactured by subjecting a mixture comprising the pigment, a liquid medium and a dispersant to dispersion treatment using a disperser or the like to prepare a pigment dispersion, and then adding various additives to the pigment dispersion as required. In this way, when manufacturing ink compositions, pigments are often used in the form of pigment dispersions, and in particular because a pigment dispersion will affect the properties of the ink composition manufactured therefrom, various art relating to pigment dispersions has been developed (see, for example, the specification of U.S. Pat. No. 5,696,182).

However, with pigment dispersions hitherto, when preparing the pigment dispersion into an ink composition, it has not been possible to simultaneously realize all of good glossiness of color images formed using the ink composition, prevention of bronzing, and good storage stability of the ink composition. That is, with ink compositions prepared from pigment dispersions hitherto, the glossiness of color images has not been sufficient, and a so-called 'bronzing' phenomenon has occurred in which, due to the particle size distribution of the discharged pigment, the recorded surface exhibits a bronze color depending on the viewing angle, and hence it has not been possible to realize high image quality, and moreover the storage stability of the ink composition has not been sufficient.

It is thus a problem of the present invention to provide a pigment dispersion that enables preparation of an ink composition that has excellent storage stability and is for forming color images that have excellent glossiness and for which bronzing is prevented. Moreover, it is another problem of the present invention to use this pigment dispersion to provide an ink composition that has excellent storage stability and enables formation of color images that have excellent glossiness and for which bronzing is prevented, and an ink set.

SUMMARY

The present inventors carried out assiduous studies, and as a result found that the above problem can be solved through each of the following pigment dispersions a to c.

a: A pigment dispersion comprising at least a pigment, an aqueous medium, a copolymer resin between a hydrophobic monomer and a hydrophilic monomer, and a urethane resin, wherein the copolymer resin and the urethane resin have a weight ratio (former/latter) in a range of 1/2 to 2/1.

b: A pigment dispersion comprising at least a pigment, an aqueous medium, a copolymer resin between a hydrophobic monomer and a hydrophilic monomer, and a urethane resin, wherein the content of the copolymer resin is in a range of 10 to 50 parts by weight per 100 parts by weight of the pigment, and the content of the urethane resin is in a range of 10 to 40 parts by weight per 100 parts by weight of the pigment.

c: A pigment dispersion comprising at least a pigment, an aqueous medium, a copolymer resin between a hydrophobic monomer and a hydrophilic monomer, and a urethane resin, wherein the copolymer resin has an acid value in a range of 50 to 320.

The present invention was achieved based on the above findings; the above problem is solved by providing a pigment dispersion comprising at least a pigment, an aqueous medium, a copolymer resin between a hydrophobic monomer and a hydrophilic monomer, and a urethane resin.

Moreover, the present invention provides the following pigment dispersions A to C as preferable forms.

A: A pigment dispersion comprising at least a pigment, an aqueous medium, a copolymer resin between a hydrophobic monomer and a hydrophilic monomer, and a urethane resin, and characterized in that the copolymer resin and the urethane resin have a weight ratio (former/latter) in a range of 1/2 to 2/1.

B: A pigment dispersion comprising at least a pigment, an aqueous medium, a copolymer resin between a hydrophobic monomer and a hydrophilic monomer, and a urethane resin, wherein the content of the copolymer resin is in a range of 10 to 50 parts by weight per 100 parts by weight of the pigment, and the content of the urethane resin is in a range of 10 to 40 parts by weight per 100 parts by weight of the pigment.

C: A pigment dispersion comprising at least a pigment, an aqueous medium, a copolymer resin between a hydrophobic monomer and a hydrophilic monomer, and a urethane resin, wherein the copolymer resin has an acid value in a range of 50 to 320.

Moreover, the present invention solves the above other problem by providing an ink composition characterized by containing at least a pigment dispersion as described above and an aqueous medium.

Furthermore, the present invention also solves the above other problem by providing an ink set characterized by comprising at least an ink composition as described above.

DETAILED DESCRIPTION

Following is a detailed description of the present invention based on preferable embodiments thereof.

Embodiment A (Pigment Dispersion)

A pigment dispersion of the present embodiment A comprises at least a pigment, an aqueous medium, a copolymer resin between a hydrophobic monomer and a hydrophilic monomer, and a urethane resin, wherein the copolymer resin and the urethane resin have a weight ratio (former/latter) in a range of 1/2 to 2/1.

In this way, the pigment dispersion of the present embodiment A is made to contain two specific resins in a specific weight ratio, whereby an ink composition that has excellent storage stability and is for forming images that have excellent glossiness and for which bronzing is prevented can be prepared, and moreover in addition to good recorded image glossiness and bronzing prevention, good discharge stability, clogging prevention, coloration stability, and high image quality comparable with that with a silver salt can be realized. With the pigment dispersion of the present embodiment A, in this way, good recorded image glossiness, bronzing prevention, and ink composition storage stability can all be achieved, and out of these in particular the glossiness is extremely good.

Moreover, in the present embodiment A, as described later, in the case of using an organic pigment as the pigment, in particular an ink composition for improving the color image glossiness, bronzing prevention, and ink composition storage stability can be prepared, and in addition to good color image glossiness and bronzing prevention, good discharge stability, clogging prevention, coloration stability, and high image quality comparable with that with a silver salt can be realized.

Note that in the present specification, all resin weights are in terms of solids.

The copolymer resin between a hydrophobic monomer and a hydrophilic monomer (which may be, for example, a styrene-acrylic acid resin) primarily functions as a dispersing resin for dispersing the pigment. This copolymer resin is adsorbed onto the pigment and thus improves the dispersibility thereof. The urethane resin primarily functions as a fixing resin for improving the glossiness of recorded images, improving adhesion, and improving stability over time.

Specific examples of the hydrophobic monomer include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxpropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, and vinyltoluene. These can be used alone, or two or more may be used mixed together.

Specific examples of the hydrophilic monomer include acrylic acid, methacrylic acid, maleic acid, and itaconic acid.

From the viewpoint of achieving all of good color image glossiness, bronzing prevention and ink composition storage stability, and moreover being able to form color images with yet better glossiness, the copolymer resin between a hydrophobic monomer and a hydrophilic monomer (hereinafter sometimes referred to merely as the 'copolymer resin') is preferably at least one of a styrene-(meth)acrylic acid copolymer resin, a styrene-methylstyrene-(meth)acrylic acid copolymer resin, a styrene-maleic acid copolymer resin, a (meth)acrylic acid-(meth)acrylic acid ester copolymer resin, and a styrene-(meth)acrylic acid-(meth)acrylic acid ester copolymer resin.

The copolymer resin may be a resin comprising a polymer obtained by reacting together styrene and acrylic acid or an acrylic acid ester (a styrene-acrylic acid resin). Alternatively, the copolymer resin may be an acrylic acid-based water-soluble resin. Alternatively, the copolymer resin may be a sodium, potassium or ammonium salt or the like of the above.

From the viewpoint of achieving all of good color image glossiness, bronzing prevention and ink composition storage stability, and moreover being able to form color images with yet better glossiness, the urethane resin is preferably a resin having urethane linkages and/or amide linkages, and acidic groups.

Here a 'urethane resin' is a resin comprising a polymer obtained by reacting together a diisocyanate compound and a diol compound.

Examples of the diisocyanate compound include aliphatic diisocyanate compounds such as hexamethylene diisocyanate and 2,2,4-trimethylhexamethylene diisocyanate, aromatic diisocyanate compounds such as toluylene diisocyanate and phenylmethane diisocyanate, and modified compounds thereof.

Examples of the diol compound include polyether type ones such as polyethylene glycol and polypropylene glycol, polyester type ones such as polyethylene adipate and polybutylene adipate, and polycarbonate type ones.

The urethane resin preferably has carboxyl groups.

The copolymer resin and the urethane resin preferably have a weight ratio (former/latter) in a range of 1/2 to 2/1, but from the viewpoint of achieving all of good color image glossiness, bronzing prevention and ink composition storage stability, and moreover being able to form color images with yet better glossiness, this weight ratio is more preferably in a range of 1/1.5 to 1.5/1.

From the viewpoint of achieving all of good color image glossiness, bronzing prevention and ink composition storage stability, and moreover being able to form color images with yet better glossiness, the weight ratio between the solid component of the pigment and non-pigment solid components (former/latter) is preferably in a range of 100/20 to 100/80.

From the viewpoint of achieving all of good color image glossiness, bronzing prevention and ink composition storage stability, and moreover being able to form color images with yet better glossiness, the content of the copolymer resin is preferably in a range of 10 to 50 parts by weight, more preferably 10 to 35 parts by weight, per 100 parts by weight of the pigment.

From the viewpoint of achieving all of good color image glossiness, bronzing prevention and ink composition storage stability, and moreover being able to form color images with yet better glossiness, the content of the urethane resin is preferably in a range of 10 to 40 parts by weight, more preferably 10 to 35 parts by weight, per 100 parts by weight of the pigment.

From the viewpoint of achieving all of good color image glossiness, bronzing prevention and ink composition storage stability, and moreover being able to form color images with yet better glossiness, the copolymer resin and the urethane resin are preferably used such that the total amount of the copolymer resin and the urethane resin is not more than 90 parts by weight (more preferably not more than 70 parts by weight) per 100 parts by weight of the pigment.

From the viewpoint of achieving all of good color image glossiness, bronzing prevention and ink composition storage stability, and moreover being able to form color images with yet better glossiness, the copolymer resin preferably has an acid value in a range of 50 to 320, more preferably 100 to 250.

From the viewpoint of achieving all of good color image glossiness, bronzing prevention and ink composition storage stability, and moreover being able to form color images with yet better glossiness, the urethane resin preferably has an acid value in a range of 10 to 300, more preferably 20 to 100.

Here the acid value is the number of mg of KOH required to neutralize 1 g of the resin.

From the viewpoint of achieving all of good color image glossiness, bronzing prevention and ink composition storage stability, and moreover being able to form color images with yet better glossiness, the copolymer resin preferably has a weight average molecular weight (Mw) in a range of 2,000 to 30,000, more preferably 2,000 to 20,000.

From the viewpoint of achieving all of good color image glossiness, bronzing prevention and ink composition storage stability, and moreover being able to form color images with yet better glossiness, the urethane resin preferably has a weight average molecular weight (Mw) before crosslinking in a range of 100 to 200,000, more preferably 1,000 to 50,000. Mw is measured by, for example, GPC (gel permeation chromatography).

From the viewpoint of achieving all of good color image glossiness, bronzing prevention and ink composition storage stability, and moreover being able to form color images with yet better glossiness, the copolymer resin preferably has a glass transition temperature (Tg; measured in accordance with JIS K6900) of at least 30° C., more preferably in a range of 50 to 130° C.

From the viewpoint of achieving all of good color image glossiness, bronzing prevention and ink composition storage stability, and moreover being able to form color images with yet better glossiness, the urethane resin preferably has a glass transition temperature (Tg; measured in accordance with JIS K6900) in a range of −50 to 200° C., more preferably −50 to 100° C.

In the pigment dispersion of the present embodiment A, the copolymer resin may be adsorbed on the pigment, or may be free, and from the viewpoint of achieving all of good color image glossiness, bronzing prevention and ink composition storage stability, and moreover being able to form color images with yet better glossiness, the copolymer resin preferably has a maximum particle diameter of not more than 0.3 µm, and more preferably has a mean particle diameter of not more than 0.2 µm (yet more preferably not more than 0.1 µm).

In the pigment dispersion of the present embodiment A, the urethane resin may be dispersed in the form of minute particles, or may be adsorbed on the pigment, and from the viewpoint of achieving all of good color image glossiness, bronzing prevention and ink composition storage stability, and moreover being able to form color images with yet better glossiness, the urethane resin preferably has a maximum particle diameter of not more than 0.3 µm, and more preferably has a mean particle diameter of not more than 0.2 µm (yet more preferably not more than 0.1 µm).

Here the mean particle diameter is the mean value of the dispersed diameter (the 50% cumulative diameter) for the particles actually formed by the pigment in the dispersion, and can be measured, for example, using a Microtrac UPA (Microtrac Inc.)

As the pigment used in the pigment dispersion of the present embodiment A, inorganic pigments and organic pigments can be used, and these pigments may be used alone or a plurality may be used mixed together. As inorganic pigments, titanium oxide and iron oxide, and also carbon black manufactured using a publicly known method such as a contact method, a furnace method or a thermal method can be used. Moreover, as organic pigments, azo pigments (including azo lakes, insoluble azo pigments, condensed azo pigments, chelated azo pigments etc.), polycyclic pigments (e.g. phthalocyanine pigments, perylene pigments, perinone pigments, anthraquinone pigments, quinacridone pigments, dioxazine pigments, thioindigo pigments, isoindolinone pigments etc.), dye chelates (e.g. basic dye type chelates, acid dye type chelates etc.), nitro pigments, nitroso pigments, aniline black and so on can be used.

Specific examples of pigments can be given as appropriate in accordance with the type (color) of the ink composition that one wishes to obtain using the pigment dispersion of the present embodiment A. For example, examples of yellow ink composition pigments include C. I. pigment yellows 1, 2, 3, 12, 14, 16, 17, 73, 74, 75, 83, 93, 95, 97, 98, 109, 110, 114, 128, 129, 138, 139, 147, 150, 151, 154, 155, 180 and 185; one or a plurality of these can be used. Out of these, it is particularly preferable to use one or a plurality selected from the group consisting of C.I. pigment yellows 74, 110, 128 and 147. Moreover, examples of magenta ink composition pigments include C.I. pigment reds 5, 7, 12, 48 (Ca), 48 (Mn), 57 (Ca), 57:1, 112, 122, 123, 168, 184, 202 and 209, and C.I. pigment violet 19; one or a plurality of these can be used. Out of these, it is particularly preferable to use one or a plurality selected from the group consisting of C.I. pigment reds 122, 202 and 209, and C.I. pigment violet 19. Moreover, examples of cyan ink composition pigments include C.I. pigment blues 1, 2, 3, 15:3, 15:4, 15:34, 16, 22 and 60, and C.I. vat blues 4 and 60; one or a plurality of these can be used. Out of these, it is particularly preferable to use C.I. pigment blue 15:3 and/or 15:4, especially C.I. pigment blue 15:3. Moreover, examples of black ink composition pigments include inorganic pigments such as carbon blacks such as furnace black, lamp black, acetylene black and channel black (C.I. pigment black 7), and iron oxide pigments, and organic pigments such as aniline black (C.I. pigment black 1).

There are no particular limitations on the concentration of the pigment in the pigment dispersion of the present embodiment A since adjustment to a suitable pigment concentration (content) may be carried out when preparing the ink composition as described later, but this concentration is generally in a range of 5 to 20 wt %.

From the viewpoint of achieving all of good color image glossiness, bronzing prevention and ink composition storage stability, and moreover being able to form color images with yet better glossiness, the pigment is preferably a pigment that has been subjected to kneading treatment with the copolymer resin.

Alternatively, excellent color images can be formed even if the pigment is an untreated pigment.

The pigment dispersion of the present embodiment A is prepared by mixing a neutralizer and/or other additive as required with the pigment, the aqueous medium, the copolymer resin between a hydrophobic monomer and a hydrophilic monomer, and the urethane resin, and then carrying out dispersion treatment using a publicly known disperser or the like. In the present embodiment A, from the viewpoint of achieving all of good color image glossiness, bronzing prevention and ink composition storage stability, and moreover being able to form color images with yet better glossiness, the pigment is preferably a pigment that has been prepared using a bead mill or an impact jet mill.

As the aqueous medium used in the pigment dispersion of the present embodiment A, water is generally used. As the water, it is preferable to use pure or ultra-pure water, for example ion exchange water, ultra-filtration water, reverse osmosis water or distilled water. In particular, such water that has been sterilized by irradiating with ultraviolet rays, adding hydrogen peroxide or the like is preferable, since then growth of mold and bacteria can be prevented over a prolonged period.

Moreover, in the aqueous medium used in the pigment dispersion of the present embodiment A, an aqueous medium as used in the ink compositions described later, for example a penetrating solvent, a wetting solvent, a surfactant or the like, may also be used together with the water or besides the water.

From the viewpoint of achieving all of good color image glossiness, bronzing prevention and ink composition storage stability, and moreover being able to form color images with yet better glossiness, the pigment dispersion of the present embodiment A is preferably subjected to ion exchange treatment or ultra-filtration.

Moreover, from the viewpoint of achieving all of good color image glossiness, bronzing prevention and ink composition storage stability, and moreover being able to form color images with yet better glossiness, it is particularly preferable for an epoxy resin having a glycidyl ether as a backbone thereof, or a resin having oxazoline groups to be added to the pigment dispersion of the present embodiment A as a crosslinking agent.

From the viewpoint of further improving the dispersibility, the crosslinking agent is preferably a resin that reacts with carboxyl groups (a carboxyl group-attacking resin). Examples include polycarbodiimide type resins having carbodiimide groups in the molecule thereof, oxazoline type resins having oxazoline groups in the molecule thereof, and aziridine type resins.

From the viewpoint of achieving all of good color image glossiness, bronzing prevention and ink composition storage stability, and moreover being able to form color images with yet better glossiness, the amount added of the crosslinking agent is preferably such that the gel fraction is at least 20%, more preferably at least 35%, relative to the total amount of carboxyl groups in the urethane resin and the copolymer resin.

Moreover, from the viewpoint of achieving all of good color image glossiness, bronzing prevention and ink composition storage stability, and moreover being able to form color images with yet better glossiness, the amount added of the crosslinking agent is preferably an amount such that the effective solid component weight ratio [weight of crosslinking agent/{total weight of copolymer resin between hydrophobic monomer and hydrophilic monomer (preferably a styrene-acrylic acid resin) and urethane resin}] is in a range of 0.5/100 to 50/100, more preferably 0.5/100 to 40/100.

From the viewpoint of achieving all of good color image glossiness, bronzing prevention and ink composition storage stability, and moreover being able to form color images with yet better glossiness, the weight average molecular weight (Mw) of the urethane resin after reaction with the crosslinking agent is preferably at least 10,000, more preferably at least 30,000.

The pigment dispersion of the present embodiment A may further contain additives as required.

(Ink Composition)

An ink composition of the present embodiment A contains at least a pigment dispersion as described above and an aqueous medium. Because the ink composition of the present embodiment A contains a pigment dispersion as described above, i.e. a pigment dispersion containing two specific resins in a specific weight ratio as dispersants, together with an aqueous medium in this way, excellent glossiness, bronzing prevention, and storage stability can be realized. Moreover, in the present embodiment A, in the case of using an organic pigment for color images as the pigment, in particular color images with improved glossiness can be formed.

The pigment dispersion used in the ink composition of the present embodiment A is as described earlier, with the matters described earlier for the pigment dispersion being applicable as appropriate.

The ink composition of the present embodiment A is obtained by mixing an aqueous medium as described below with the pigment dispersion; from the viewpoint of obtaining mirror-like glossiness, the pigment dispersion and the aqueous medium are preferably mixed together such that the content (concentration) of the pigment in the ink composition is not more than 10 wt %, particularly preferably 1.5 to 3.0 wt %, of the ink composition.

For the aqueous medium used in the ink composition of the present embodiment A, in general water, a penetrating solvent, a wetting solvent, a surfactant and so on are used.

Here, the water used in the aqueous medium may be the same as the water used in the pigment dispersion described earlier, and is generally put into the ink composition for balance after the penetrating solvent, the wetting solvent, the surfactant and so on have been mixed in.

Moreover, the penetrating solvent has a function of increasing the wettability to a recording medium and thus increasing the penetrability; from the viewpoint of improving the penetrability, it is particularly preferable to use an alkanediol and/or a glycol ether.

Examples of alkanediols include 1,2-pentanediol and 1,2-hexanediol.

Examples of glycol ethers include ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether.

One or a plurality of these penetrating solvents may be used.

The content of the penetrating solvent in the ink composition of the present embodiment A is preferably in a range of 1 to 20 wt %, more preferably 1 to 10 wt %.

Moreover, the wetting solvent has a function, in the case of use in ink jet recording, of preventing drying of the ink and hence preventing clogging at an ink jet printer head; from the viewpoint of improving clogging prevention, it is particularly preferable to use a polyhydric alcohol, with specific examples including ethylene glycol, diethylene glycol, triethylene glycol, polyethylene glycol, polypropylene glycol, propylene glycol, butylene glycol, 1,2,6-hexanetriol, thiodiglycol, hexylene glycol, glycerol, trimethylol ethane, and trimethylol propane.

Moreover, urea, 2-pyrrolidone, N-methyl-2-pyrrolidone, 1,3-dimethyl-2-imidazolidinone, triethanolamine, a sachharide such as a sugar alcohol or the like can also be used as a wetting solvent.

The content of the wetting solvent in the ink composition of the present embodiment A is preferably in a range of 0.1 to 30 wt %, more preferably 0.5 to 20 wt %.

Moreover, the surfactant has a function of increasing the wettability to a recording medium and thus increasing the penetrability; from the viewpoint of improving the penetrability, it is particularly preferable to use an acetylenic glycol and/or a polysiloxane.

As an acetylenic glycol type compound, a commercially sold one can be used; examples include Olfine Y, and Surfinol 82, 440, 465, STG and E1010 (all trade names, made by Air Products and Chemicals), with Surfinol 465 being particularly preferable.

As a polysiloxane type compound, a commercially sold one can be used; examples include BYK 348 (made by BYK Chemie Japan).

Moreover, any of various types of surfactant such as a cationic surfactant, an anionic surfactant or a nonionic surfactant can be used as a surfactant.

One or a plurality of such surfactants may be used.

The content of the surfactant in the ink composition of the present embodiment A is preferably in a range of 0.1 to 5.0 wt %, more preferably 0.2 to 1.0 wt %.

It is preferable for the ink composition of the present embodiment A to further contain an organic pH adjuster or an inorganic pH adjuster, and it is particularly preferable to use an alkanolamine or an alkylamine as a pH adjuster. Through including a pH adjuster, not only is the storage stability of the ink improved, but moreover there is a function of preventing the ink from undergoing a rapid pH change on the recording medium and hence increasing the glossiness; in particular, by using an alkanolamine or an alkylamine as a pH adjuster, the mirror-like glossiness can be increased.

Examples of alkanolamines include triethanolamine, monoethanolamine, diethanolamine, dimethylethanolamine, and diethylethanolamine.

Examples of alkylamines include triethylamine, monoethylamine, diethylamine, dimethylethylamine, and diethylmethylamine.

One or a plurality of such pH adjusters may be used.

The content of the pH adjuster in the ink composition of the present embodiment A is preferably in a range of 0.1 to 5.0 wt %, more preferably 0.3 to 1.5 wt %.

From the viewpoint of achieving all of good color image glossiness, bronzing prevention and ink composition storage stability, and moreover being able to form color images with yet better glossiness, the ink composition of the present embodiment A preferably has a pH of at least 8.0, and the pigment preferably has a maximum particle diameter of not more than 0.3 μm, and a 50% cumulative dispersed diameter of not more than 0.15 μm.

Additives such as fixing agents such as water-soluble rosins, anti-mold agents/preservatives such as sodium benzoate, antioxidants/ultraviolet absorbers such as allophanates, chelating agents and so on can be further included in the ink composition of the present embodiment A as required; one or a plurality of these can be used.

The ink composition of the present embodiment A can be prepared as with a conventional ink composition prepared using a pigment dispersion. During the preparation, it is preferable to remove coarse particles using a membrane filter, a mesh filter or the like.

There are no limitations whatsoever on the use of the ink composition of the present embodiment A; the ink composition can be used as any of various ink compositions such an ink for ink jet printers or an ink for writing instruments such as pens, but in particular can be preferably used in an ink jet recording method, which is a recording method in which droplets of the ink are ejected from nozzles and the droplets are attached onto a recording medium to form images such as graphics or characters, with use in an on-demand type ink jet recording method being especially preferable. Examples of on-demand type ink jet recording methods include, for example, a piezoelectric element recording method in which recording is carried out using piezoelectric elements arranged on a printer head, and a thermal jet recording method in which recording is carried out using thermal energy from heat-generating resistive element heaters or the like arranged on a printer head; the ink composition can be suitably used with either of these ink jet recording methods.

(Ink Set)

An ink set of the present embodiment A comprises at least an ink composition as described above. Because the ink set of the present embodiment A contains an ink composition containing a pigment dispersion as described earlier, i.e. a pigment dispersion containing two specific resins in a specific weight ratio as dispersants, together with an aqueous medium in this way, excellent glossiness, bronzing prevention, and storage stability can be realized. Moreover, in the present embodiment A, in the case of using an ink composition that uses an organic pigment for color images as the pigment, in particular color images with improved glossiness can be formed.

There are no particular limitations on the number and types (colors) of ink compositions in the ink set of the present embodiment A, and as the above-mentioned ink composition, a yellow ink composition, a magenta ink composition, a cyan ink composition, a black ink composition or the like can be used alone, or a combination of a plurality thereof or the like can be used. In particular, the ink set of the present embodiment A preferably comprises at least chromatic color ink compositions such as a yellow ink composition, a magenta ink composition and a cyan ink composition as the above-mentioned ink composition, since then the glossiness of color images in particular can be improved.

There are no limitations whatsoever on the use of the ink set of the present embodiment A, but use in an ink jet recording method is particularly preferable, with the details of this use being as for the use of the ink composition described earlier.

(Method of Manufacturing Pigment Dispersion)

A method of manufacturing a pigment dispersion of the present embodiment A preferably comprises a pretreatment step of making the pigment particle diameter minute and uniform through kneading treatment or carrying out no treatment, a dispersion step of adding a copolymer resin between a hydrophobic monomer and a hydrophilic monomer, and then dispersing the pigment using a bead mill or an impact jet mill, and an after-treatment step of further adding a urethane resin and a crosslinking agent and carrying out crosslinking treatment.

After the pretreatment step but before the dispersion step, it is preferable to carry out neutralization treatment by adding an alkaline compound to the pigment.

In the dispersion step, the dispersion treatment is preferably carried out using a bead mill or an impact jet mill as described above. Such a bead mill may be either a type enabling the particles to be made minute or an ordinary type. The dispersion treatment conditions are adjusted as appropriate, and the dispersion treatment is carried out until the copolymer resin has reached a preferable particle diameter as described earlier. In the dispersion treatment, if required, it is possible to add an organic solvent and carry out kneading.

Through the present step, the copolymer resin can be firmly fixed onto the surface of the pigment.

After the dispersion step, it is preferable to carry out an impurity removal step using ion exchange treatment or ultra-filtration, and then carry out the after-treatment step. Through ion exchange treatment, ionic substances, i.e. anions and cations (e.g. bivalent metal ions etc.) can be removed, and through ultra-filtration, dissolved impurities (residual matter from the pigment synthesis, excess components in the dispersion composition, resin not adsorbed on the organic pigment, contaminants etc.) can be removed. The ion exchange treatment is carried out using a publicly known ion exchange resin. The ultra-filtration is carried out using a publicly known ultra-filtration membrane, which may be an ordinary type or a double capacity type.

In the after-treatment step, by adding the urethane resin and the crosslinking agent and carrying out a crosslinking reaction, the copolymer resin and the urethane resin are crosslinked by the crosslinking agent, thus covering (encapsulating) the pigment surface, and hence promoting an improvement in the stability over time, a reduction in the viscosity, and an improvement in the adhesion, whereby the pigment dispersion is stabilized.

Embodiment B (Pigment Dispersion)

A pigment dispersion of the present embodiment B comprises at least a pigment, an aqueous medium, a copolymer resin between a hydrophobic monomer and a hydrophilic monomer, and a urethane resin, wherein the content of the copolymer resin is in a range of 10 to 50 parts by weight per 100 parts by weight of the pigment, and the content of the urethane resin is in a range of 10 to 40 parts by weight per 100 parts by weight of the pigment.

In this way, the pigment dispersion of the present embodiment B is made to contain two specific resins in specific contents, whereby an ink composition that has excellent storage stability and is for forming images that have excellent glossiness and for which bronzing is prevented can be prepared, and moreover in addition to good recorded image glossiness and bronzing prevention, good discharge stability, clogging prevention, coloration stability, and high image quality comparable with that with a silver salt can be realized. With the pigment dispersion of the present embodiment B, in this way, good recorded image glossiness, bronzing prevention, and ink composition storage stability can all be achieved, and out of these in particular the bronzing prevention effect is extremely good.

In the present embodiment B, points that are not described in particular detail here are as described earlier for embodiment A. For the pigment dispersion of the present embodiment B, apart from parts that differ to embodiment A, the matters described earlier for embodiment A are thus applicable as appropriate.

That is, in the present embodiment B, the function of the copolymer resin between a hydrophobic monomer and a hydrophilic monomer, the function of the urethane resin, specific examples of the hydrophobic monomer, specific examples of the hydrophilic monomer, and so on are as for embodiment A described earlier.

Moreover, in the present embodiment B, for the same reasons as in the case of embodiment A described earlier, preferable specific examples of the copolymer resin, specific examples of the urethane resin, and examples of the diisocyanate compound and the diol compound forming the urethane resin are as in the case of embodiment A described earlier.

From the viewpoint of achieving all of good color image glossiness, bronzing prevention and ink composition storage stability, and moreover being able to form color images with yet better bronzing resistance, the content of the copolymer resin is preferably in a range of 10 to 50 parts by weight, more preferably 10 to 35 parts by weight, per 100 parts by weight of the pigment.

From the viewpoint of achieving all of good color image glossiness, bronzing prevention and ink composition storage stability, and moreover being able to form color images with yet better bronzing resistance, the content of the urethane resin is preferably in a range of 10 to 40 parts by weight, more preferably 10 to 35 parts by weight, per 100 parts by weight of the pigment.

From the viewpoint of achieving all of good color image glossiness, bronzing prevention and ink composition storage stability, and moreover being able to form color images with yet better bronzing resistance, the copolymer resin and the urethane resin preferably have a weight ratio (former/latter) in a range of 1/2 to 2/1, more preferably 1/1.5 to 1.5/1.

Moreover, in the present embodiment B, with regard to the weight ratio between the solid component of the pigment and non-pigment solid components, the total amount of the copolymer resin and the urethane resin, the acid value of the copolymer resin, the acid value of the urethane resin, the weight average molecular weight (Mw) of the copolymer resin, the weight average molecular weight (Mw) of the urethane resin before crosslinking, the glass transition temperature of the copolymer resin, the glass transition temperature of the urethane resin, the maximum particle diameter of the copolymer resin, the maximum particle diameter of the urethane resin, and so on, from the viewpoint of achieving all of good color image glossiness, bronzing prevention and ink composition storage stability, and moreover being able to form color images with yet better bronzing resistance, a form like that in embodiment A described earlier is preferably used.

In the present embodiment B, with regard to examples of the pigment used in the pigment dispersion, the concentration of the pigment, the method of preparing the pigment, the aqueous medium, preferable examples of the crosslinking agent, the amount added of the crosslinking agent, the weight average molecular weight (Mw) of the urethane resin after reaction with the crosslinking agent, other additives, and so on, these are as in embodiment A described earlier.

Moreover, in the present embodiment B, from the viewpoint of achieving all of good color image glossiness, bronzing prevention and ink composition storage stability, and moreover being able to form color images with yet better bronzing resistance, the pigment is preferably a pigment that has been subjected to kneading treatment with the copolymer resin, and is preferably a pigment that has been prepared using a bead mill or an impact jet mill. Moreover, from the same viewpoint, the pigment dispersion of the present embodiment B is preferably subjected to ion exchange treatment or ultra-filtration, and preferably has added thereto as a crosslinking agent an epoxy resin having a glycidyl ether as a backbone thereof or a resin having oxazoline groups.

(Ink Composition)

An ink composition of the present embodiment B contains at least a pigment dispersion as described above and an aqueous medium. Because the ink composition of the present embodiment B contains a pigment dispersion as described above, i.e. a pigment dispersion containing two specific resins in specific contents as dispersants, together with an aqueous medium in this way, excellent glossiness, bronzing prevention, and storage stability can be realized. Moreover, in the present embodiment B, in the case of using an organic pigment for color images as the pigment, in particular color images with improved glossiness and bronzing resistance can be formed.

With regard to the content (concentration) of the pigment in the ink composition of the present embodiment B, the aqueous medium, the penetrating solvent, wetting solvent and surfactant in the aqueous medium, the pH adjuster, other additives, the method of preparing the ink composition of the present embodiment B, the use thereof, and so on, these are as in Embodiment A described earlier.

From the viewpoint of achieving all of good color image glossiness, bronzing prevention and ink composition storage stability, and moreover being able to form color images with yet better bronzing resistance, the ink composition of the present embodiment B preferably has a pH of at least 8.0, a pigment maximum particle diameter of not more than 0.3 μm, and a pigment 50% cumulative dispersed diameter of not more than 0.15 μm.

(Ink Set)

An ink set of the present embodiment B comprises at least an ink composition as described above. Because the ink set of the present embodiment B contains an ink composition containing a pigment dispersion as described earlier, i.e. a pigment dispersion containing two specific resins in specific contents as dispersants, together with an aqueous medium in this way, excellent glossiness, bronzing prevention, and ink composition storage stability can be realized. Moreover, in the present embodiment B, in the case of using an ink composition that uses an organic pigment for color images as the pigment, in particular color images with improved glossiness and bronzing resistance can be formed.

With regard to the number and types (colors) of ink compositions in the ink set of the present embodiment B, and the use of the ink set, these are as in Embodiment A.

In particular, the ink set of the present embodiment B preferably comprises at least chromatic color ink compositions such as a yellow ink composition, a magenta ink composition and a cyan ink composition as the above-mentioned ink composition, since then the glossiness and bronzing resistance of color images in particular can be improved.

(Method of Manufacturing Pigment Dispersion)

As with embodiment A described earlier, a method of manufacturing a pigment dispersion of the present embodiment B preferably comprises a pretreatment step of making the pigment particle diameter minute and uniform through kneading treatment or carrying out no treatment, a dispersion step of adding a copolymer resin between a hydrophobic monomer and a hydrophilic monomer, and then dispersing the pigment using a bead mill or an impact jet mill, and an after-treatment step of further adding a urethane resin and a crosslinking agent and carrying out crosslinking treatment.

Regarding the details of each of the steps, the matters described earlier for embodiment A are similarly applicable.

Embodiment C (Pigment Dispersion)

A pigment dispersion of the present embodiment C comprises at least a pigment, an aqueous medium, a copolymer resin between a hydrophobic monomer and a hydrophilic monomer, and a urethane resin, wherein the copolymer resin has an acid value in a range of 50 to 320.

In this way, the pigment dispersion of the present embodiment C is made to contain two specific resins, one of which has an acid value in a specific range, whereby an ink composition that has excellent storage stability and is for forming images that have excellent glossiness and for which bronzing is prevented can be prepared, and moreover in addition to good recorded image glossiness and bronzing prevention, good discharge stability, clogging prevention, coloration stability, and high image quality comparable with that with a silver salt can be realized. With the pigment dispersion of the present embodiment C, in this way, good recorded image glossiness, bronzing prevention, and ink composition storage stability can all be achieved, and out of these in particular the bronzing prevention effect and the storage stability are extremely good.

In the present embodiment C, points that are not described in particular detail here are as described earlier for embodiment A. For the pigment dispersion of the present embodiment C, apart from parts that differ to embodiment A, the matters described earlier for embodiment A are thus applicable as appropriate.

That is, in the present embodiment C, the function of the copolymer resin between a hydrophobic monomer and a hydrophilic monomer, the function of the urethane resin, specific examples of the hydrophobic monomer, specific examples of the hydrophilic monomer, and so on are as for embodiment A described earlier.

Moreover, in the present embodiment C, for the same reasons as in the case of embodiment A described earlier, preferable specific examples of the copolymer resin, specific examples of the urethane resin, and examples of the diisocyanate compound and the diol compound forming the urethane resin are as in the case of embodiment A described earlier.

From the viewpoint of achieving all of good color image glossiness, bronzing prevention and ink composition storage stability, and moreover the glossiness and the storage stability being yet better, the copolymer resin preferably has an acid value in a range of 50 to 320.

From the viewpoint of achieving all of good color image glossiness, bronzing prevention and ink composition storage stability, and moreover the glossiness and the storage stability being yet better, the copolymer resin and the urethane resin preferably have a weight ratio (former/latter) in a range of 1/2 to 2/1, more preferably 1/1.5 to 1.5/1.

Moreover, in the present embodiment C, with regard to the content of the copolymer resin, the content of the urethane resin, the acid value of the urethane resin, the weight average molecular weight (Mw) of the copolymer resin, the weight average molecular weight (Mw) of the urethane resin before crosslinking, the glass transition temperature of the copolymer resin, the glass transition temperature of the urethane resin, the maximum particle diameter and the mean particle diameter of the copolymer resin, the maximum particle diameter and the mean particle diameter of the urethane resin, and so on, from the viewpoint of achieving all of good color image glossiness, bronzing prevention and ink composition storage stability, and moreover the glossiness and the storage stability being yet better, a form like that in embodiment A described earlier is preferably used.

Moreover, in the present embodiment C, with regard to the total amount of the copolymer resin and the urethane resin, from the viewpoint of achieving all of good color image glossiness, bronzing prevention and ink composition storage stability, and moreover the storage stability being yet better, a form like that in embodiment A described earlier is preferably used.

In the present embodiment C, with regard to examples of the pigment used in the pigment dispersion, the concentration of the pigment, the method of preparing the pigment, the aqueous medium, preferable examples of the crosslinking agent, the amount added of the crosslinking agent, the weight average molecular weight (Mw) of the urethane resin after reaction with the crosslinking agent, other additives, and so on, these are as in embodiment A described earlier.

Moreover, in the present embodiment C, from the viewpoint of achieving all of good color image glossiness, bronzing prevention and ink composition storage stability, and moreover the glossiness and the storage stability being yet better, the pigment is preferably a pigment that has been subjected to kneading treatment with the copolymer resin, and is preferably a pigment that has been prepared using a bead mill or an impact jet mill. Moreover, from the same viewpoint, the pigment dispersion of the present embodiment C is preferably subjected to ion exchange treatment or ultrafiltration, and preferably has added thereto as a crosslinking agent an epoxy resin having a glycidyl ether as a backbone thereof or a resin having oxazoline groups.

(Ink Composition)

An ink composition of the present embodiment C contains at least a pigment dispersion as described above and an aqueous medium. Because the ink composition of the present embodiment C contains a pigment dispersion as described above, i.e. a pigment dispersion containing two specific resins as dispersants, one of which has an acid value in a specific range, together with an aqueous medium in this way, excellent glossiness, bronzing prevention, and storage stability can be realized. Moreover, in the present embodiment C, in the case of using an organic pigment for color images as the pigment, in particular the glossiness and the ink storage stability can be improved.

With regard to the content (concentration) of the pigment in the ink composition of the present embodiment C, the aqueous medium, the penetrating solvent, wetting solvent and surfactant in the aqueous medium, the pH adjuster, the pH of the ink composition of the present embodiment C, the maximum particle diameter and the 50% cumulative dispersed diameter of the pigment, other additives, the method of preparing the ink composition of the present embodiment C, the use thereof, and so on, these are as in Embodiment A described earlier.

(Ink Set)

An ink set of the present embodiment C comprises at least an ink composition as described above. Because the ink set of the present embodiment C contains an ink composition containing a pigment dispersion as described earlier, i.e. a pigment dispersion containing two specific resins as dispersants, one of which has an acid value in a specific range, together with an aqueous medium in this way, excellent glossiness, bronzing prevention, and ink composition storage stability can be realized. Moreover, in the present embodiment C, in the case of using an ink composition that uses an organic pigment for color images as the pigment, in particular the glossiness and the ink storage stability can be improved.

With regard to the number and types (colors) of ink compositions in the ink set of the present embodiment C, and the use of the ink set, these are as in Embodiment A.

(Method of Manufacturing Pigment Dispersion)

As with embodiment A described earlier, a method of manufacturing a pigment dispersion of the present embodiment C preferably comprises a pretreatment step of making the pigment particle diameter minute and uniform through kneading treatment or carrying out no treatment, a dispersion step of adding a copolymer resin between a hydrophobic monomer and a hydrophilic monomer, and then dispersing the pigment using a bead mill or an impact jet mill, and an after-treatment step of further adding a urethane resin and a crosslinking agent and carrying out crosslinking treatment.

Regarding the details of each of the steps, the matters described earlier for embodiment A are similarly applicable.

The present invention has been described in detail above based on preferable embodiments thereof, but the present invention is not limited to the embodiments described above, with it being possible to carry out various modifications within a scope such that the gist of the present invention is not deviated from.

Moreover, according to the present invention, there can also be provided an excellent recording method (in particular an ink jet recording method) using a pigment dispersion, an ink composition or an ink set as described above, and a good recorded article obtained using this recording method.

EXAMPLES

Following is a more specific description of the present invention, citing working examples and experimental examples for the present invention; however, the present invention is not limited whatsoever by these working examples. Note that, unless particularly stated otherwise, mixing proportions (%, parts) and ratios indicate wt %, parts by weight, and weight ratios.

Working Examples A

Pigment dispersions (1) to (6) according to Working Examples A, and pigment dispersions (7) to (9) according to comparative examples were prepared as follows.

(Pigment Dispersion (1): Yellow)

Undermentioned mixture (1)-1 was charged into a pressurizing kneader, and kneading was carried out for 10 hours at room temperature, thus preparing a kneaded pigment material.

| Mixture (1)-1 | Parts by weight |
| --- | --- |
| C.I pigment yellow 74 | 20 |
| Styrene-methylstyrene-acrylic acid copolymer (acid value 160, weight average molecular weight 8,000, glass transition temperature 75° C.) | 3 |
| Glycerol | 15 |
| Isopropyl alcohol | 4 |
| Kneaded pigment material | 42 |

Next, the components indicated below were charged into an agitator, and agitation with heating was carried out for 2 hours at 95° C., thus preparing an undispersed pigment preparation.

| | Parts by weight |
|---|---|
| Above-mentioned kneaded pigment material | 42 |
| Neutralizer: triethanolamine | 3 |
| Ion exchange water | 55 |
| Undispersed pigment preparation | 100 |

Next, the undispersed pigment preparation was successively charged into a bead mill able to make the undispersed pigment preparation particles minute (having an ability to produce 50 nm organic pigment minute particles), and treatment was carried out over three passes, thus preparing a dispersed pigment preparation.

Next, the dispersed pigment preparation was adjusted to pH 8.5 using sodium hydroxide, centrifugation was carried out for 5 minutes at 25,000 G, and coarse particles were removed, thus preparing a readjusted dispersed pigment preparation. The readjusted dispersed preparation had a solid content of 23.0%, a pH of 8.3, and a pigment particle diameter (50% cumulative dispersed diameter) of no more than 100 nm.

Next, undermentioned mixture (1)-2 was charged into an agitator, and agitation was carried out for 5 hours at 90° C., thus crosslinking the resins in the dispersion, and hence obtaining a crosslinked preparation (hereinafter referred to as the 'crosslinking step'). The pH of the crosslinked preparation was approximately 8. Adjustment was further carried out with ion exchange water and potassium hydroxide such that the pigment solid component concentration became 10% and the pH became approximately 9, thus preparing pigment dispersion (1). In terms of charged-in theoretical amounts, the pigment dispersion (1) obtained had a styrene-methylstyrene-acrylic acid copolymer content of approximately 15 parts and a polyester type polyurethane resin content of approximately 15 parts per 100 parts of the pigment.

| Mixture (1)-2 | Parts by weight |
|---|---|
| Above-mentioned readjusted dispersed preparation | 100 |
| Polyester type polyurethane resin (solid content 30%) (acid value 50, neutralized with triethylamine) | 10 |
| Crosslinking agent: epoxy resin having 20% glycidyl ether backbone (epoxy equivalent 200) | 8 |
| Crosslinked preparation | 118 |

(Pigment Dispersion (2): Magenta)

Undermentioned mixture (2)-1 was charged into a pressurizing kneader, and kneading was carried out for 10 hours at room temperature, thus preparing a kneaded pigment material.

| Mixture (2)-1 | Parts by weight |
|---|---|
| C.I pigment violet 19 | 20 |
| Styrene-methylstyrene-acrylic acid copolymer (acid value 160, weight average molecular weight 8,000, glass transition temperature 75° C.) | 2 |
| Glycerol | 15 |
| Isopropyl alcohol | 4 |
| Kneaded pigment material | 41 |

An undispersed pigment preparation, a dispersed pigment preparation, and a readjusted dispersed preparation were prepared as with pigment dispersion (1). Next, undermentioned mixture (2)-2 was charged into an agitator, and agitation was carried out for 5 hours at 90° C., thus crosslinking the resins in the dispersion, and hence obtaining a crosslinked preparation. The pH of the crosslinked preparation was approximately 8. Adjustment was further carried out with ion exchange water and potassium hydroxide such that the pigment solid component concentration became 10% and the pH became approximately 9, thus preparing pigment dispersion (2). In terms of charged-in theoretical amounts, the pigment dispersion (2) obtained had a styrene-methylstyrene-acrylic acid copolymer content of approximately 10 parts and a polyether type polyurethane resin content of approximately 10 parts per 100 parts of the pigment.

| Mixture (2)-2 | Parts by weight |
|---|---|
| Above-mentioned readjusted dispersed preparation | 100 |
| Polyether type polyurethane resin (solid content 20%) (acid value 50, neutralized with triethylamine) | 10 |
| Crosslinking agent: epoxy resin having 20% glycidyl ether backbone (epoxy equivalent 200) | 8 |
| Crosslinked preparation | 118 |

(Pigment Dispersion (3): Cyan)

Undermentioned mixture (3)-1 was charged into a pressurizing kneader, and kneading was carried out for 10 hours at room temperature, thus preparing a kneaded pigment material.

| Mixture (3)-1 | Parts by weight |
|---|---|
| C.I pigment blue 15:3 | 20 |
| Styrene-methylstyrene-acrylic acid copolymer (acid value 160, weight average molecular weight 8,000, glass transition temperature 75° C.) | 4 |
| Glycerol | 15 |
| Isopropyl alcohol | 4 |
| Kneaded pigment material | 43 |

An undispersed pigment preparation, a dispersed pigment preparation, a readjusted dispersed preparation, and a crosslinked preparation were prepared as with pigment dispersion (1). Furthermore, undermentioned mixture (3)-2 was charged into an agitator, and agitation was carried out for 5 hours at 90° C., thus crosslinking the resins in the dispersion, and hence obtaining a crosslinked preparation. Adjustment was further carried out with ion exchange water and potassium hydroxide such that the pigment solid component concentration became 10% and the pH became approximately 9, thus preparing pigment dispersion (3). The pigment dispersion (3) obtained had a styrene-methylstyrene-acrylic acid copolymer content of approximately 20 parts and a polycarbonate type polyurethane resin content of approximately 20 parts per 100 parts of the pigment.

| Mixture (3)-2 | Parts by weight |
|---|---|
| Above-mentioned readjusted dispersed preparation | 100 |
| Polycarbonate type polyurethane resin (solid content 20%) (acid value 50, neutralized with triethylamine) | 20 |
| Crosslinking agent: epoxy resin having 20% glycidyl ether backbone (epoxy equivalent 200) | 8 |
| Crosslinked preparation | 128 |

(Pigment Dispersion (4): Yellow)

Pigment dispersion (4) was prepared as with pigment dispersion (2), except that the polyether type polyurethane resin of pigment dispersion (2) was changed to a polycarbonate type urethane resin, and the amount charged in was changed to 4 parts by weight, and moreover the pigment was changed to C.I pigment yellow 74. The pigment dispersion (4) obtained had a styrene-methylstyrene-acrylic acid copolymer content of approximately 10 parts and a polycarbonate type urethane resin content of approximately 20 parts per 100 parts of the pigment.

(Pigment Dispersion (5): Magenta)

Pigment dispersion (5) was prepared as with pigment dispersion (2), except that the amount charged in of the styrene-methylstyrene-acrylic acid copolymer of pigment dispersion (2) was changed to 4 parts by weight, and moreover the polyether type polyurethane resin was changed to a polyester type urethane resin. The pigment dispersion (5) obtained had a styrene-methylstyrene-acrylic acid copolymer content of approximately 20 parts and a polyester type polyurethane resin content of approximately 10 parts per 100 parts of the pigment.

(Pigment Dispersion (6): Cyan)

Pigment dispersion (6) was prepared as with pigment dispersion (3), except that the polycarbonate type polyurethane resin of pigment dispersion (3) was changed to a polyether type polyurethane resin, and the crosslinking agent was changed to an oxazoline type crosslinking agent (oxazoline equivalent 200), and moreover the amount charged in was changed to 4 parts by weight. The pigment dispersion (6) obtained had a styrene-methylstyrene-acrylic acid copolymer content of approximately 20 parts and a polyether type polyurethane resin content of approximately 20 parts per 100 parts of the pigment.

(Pigment Dispersions (7) to (9): Yellow, Magenta and Cyan)

An undispersed pigment preparation, a dispersed pigment preparation, and a readjusted dispersed preparation were prepared as with pigment dispersion (1), with the pigment of pigment dispersion (1) being changed to C.I pigment yellow 74, C.I pigment violet 19 or C.I pigment blue 15:3 respectively. In each case, without carrying out the crosslinking step, adjustment was carried out with ion exchange water and potassium hydroxide such that the pigment solid component concentration became 10% and the pH became approximately 9, whereby pigment dispersions (7) to (9) (yellow, magenta and cyan) were prepared.

Using the above pigment dispersions (1) to (6), ink compositions according to Working Examples A were prepared as in Table 1.

TABLE 1

| Working example | Yellow (1) Amount (%) | Magenta (1) Amount (%) | Cyan (1) Amount (%) | Yellow (2) Amount (%) | Magenta (2) Amount (%) | Cyan (2) Amount (%) | Yellow (3) Amount (%) | Magenta (3) Amount (%) | Cyan (3) Amount (%) |
|---|---|---|---|---|---|---|---|---|---|
| Gly | | | | | | | 15.50 | 15.00 | 12.50 |
| TEA | 0.90 | 0.90 | 0.90 | 0.90 | 0.90 | 0.90 | 0.90 | 0.90 | 0.90 |
| 1,2-HD | 7.00 | 10.00 | 0.00 | 10.00 | 0.00 | 7.00 | 3.00 | 3.00 | 3.00 |
| TEGmBE | 3.00 | 0.00 | 10.00 | 0.00 | 10.00 | 3.00 | 7.00 | 7.00 | 7.00 |
| BYK 348 | | | | | | | 0.30 | 0.30 | 0.30 |
| E1010 | | | | | | | 0.10 | 0.10 | 0.10 |
| Proxel XL2 | | | | | | | 0.30 | 0.30 | 0.30 |
| EDTA | | | | | | | 0.02 | 0.02 | 0.02 |
| Benzotriazole | | | | | | | 0.05 | 0.05 | 0.05 |
| Pure water | 59.10 | 69.10 | 74.10 | 59.10 | 69.10 | 74.10 | 72.93 | 73.43 | 6.23 |
| Pigment dispersion (1) | 30.00 | | | | | | 70.00 | | |
| Pigment dispersion (2) | | 20.00 | | | | | | 70.00 | |
| Pigment dispersion (3) | | | 15.00 | | | | | | 70.00 |
| Pigment dispersion (4) | | | | 30.00 | | | | | |
| Pigment dispersion (5) | | | | | 20.00 | | | | |
| Pigment dispersion (6) | | | | | | 15.00 | | | |
| Total | 100.00 | 100.00 | 100.00 | 100.00 | 100.00 | 100.00 | 100.00 | 100.00 | 100.00 |

Using the above pigment dispersions (7) to (9), ink compositions according to comparative examples were prepared as in Table 2.

TABLE 2

| Comparative example | Yellow (4) Amount (%) | Magenta (4) Amount (%) | Cyan (4) Amount (%) | Yellow (5) Amount (%) | Magenta (5) Amount (%) | Cyan (5) Amount (%) |
|---|---|---|---|---|---|---|
| Gly | 15.50 | 15.00 | 12.50 | 15.50 | 15.00 | 12.50 |
| TEA | 0.90 | 0.90 | 0.90 | 0.90 | 0.90 | 0.90 |
| 1,2-HD | 7.00 | 10.00 | 0.00 | 3.00 | 3.00 | 3.00 |
| TEGmBE | 3.00 | 0.00 | 10.00 | 7.00 | 7.00 | 7.00 |
| BYK 348 | 0.30 | 0.30 | 0.30 | 0.30 | 0.30 | 0.30 |
| E1010 | 0.10 | 0.10 | 0.10 | 0.10 | 0.10 | 0.10 |
| Proxel XL2 | 0.30 | 0.30 | 0.30 | 0.30 | 0.30 | 0.30 |
| EDTA | 0.02 | 0.02 | 0.02 | 0.02 | 0.02 | 0.02 |
| Benzotriazole | 0.05 | 0.05 | 0.05 | 0.05 | 0.05 | 0.05 |
| Pure water | 42.93 | 53.43 | 61.23 | 2.93 | 3.43 | 6.23 |
| Pigment dispersion (7) | 30.00 | | | 70.00 | | |
| Pigment dispersion (8) | | 20.00 | | | 70.00 | |
| Pigment dispersion (9) | | | 15.00 | | | 70.00 |
| Total | 100.00 | 100.00 | 100.00 | 100.00 | 100.00 | 100.00 |

Experimental Examples

The ink compositions of the above working examples and comparative examples were filled into an ink jet printer (PM900C made by Seiko Epson Corporation), and printing was carried out at 80% duty (weight of ink 10 to 11 mg/inch$^2$) at 720×720 dpi on ink jet specialist paper (PM photographic paper made by Seiko Epson Corporation).

Here the 'duty' is the value calculated from the following formula.

Duty (%)=Actual number of dots printed/(vertical resolution×horizontal resolution) ×100

(In the formula, the 'actual number of dots printed' is the actual number of dots printed per unit area, and the 'vertical resolution' and the 'horizontal resolution' are the resolutions per unit area. 100% duty means the maximum weight of ink of a single color for the pixels.)

(Evaluation of Glossiness Bestowing Ability)

For each of the recorded articles, the glossiness was measured using a 'GP-200' (made by Murakami Color Research Laboratory) under conditions of 12 V, 50 W, an incident light beam aperture diameter of 1 mm, a reflected light beam aperture diameter of 1.5 mm, an ND10 filter, an angle of incidence of 45°, a tilt angle of 0°, and a 42.5 standard specular plate. The mean of the maximum value of the glossiness was calculated for the evaluated colors, and this was taken as the mean glossiness. The glossiness bestowing ability was evaluated as follows from the value of the mean glossiness.

AA: Mean glossiness at least 50
A: Mean glossiness at least 40 but less than 50
B: Mean glossiness at least 30 but less than 40
C: Mean glossiness at least 20 but less than 30
D: Mean glossiness at least 10 but less than 20
E: Mean glossiness less than 10

The glossiness bestowing ability evaluation results are shown in Table 3.

TABLE 3

| Working example | Yellow (1) | Magenta (1) | Cyan (1) | Yellow (2) | Magenta (2) | Cyan (2) | Yellow (3) | Magenta (3) | Cyan (3) |
|---|---|---|---|---|---|---|---|---|---|
| Glossiness | AA | AA | AA | AA | AA | AA | B | B | B |
| Comparative example | Yellow (4) | Magenta (4) | Cyan (4) | | Yellow (5) | Magenta (5) | | Cyan (5) | |
| Glossiness | A | A | A | | C | C | | C | |

As shown in Table 3, it was found that the inks according to Working Examples A give better glossiness than the inks according to the comparative examples.

Working Examples B

Pigment dispersions (1) to (6) according to Working Examples B, and pigment dispersions (7) to (9) according to comparative examples were prepared as follows.

(Pigment Dispersion (1): Yellow)

Undermentioned mixture (1)-1 was charged into a pressurizing kneader, and kneading was carried out for 10 hours at room temperature, thus preparing a kneaded pigment material.

| Mixture (1)-1 | Parts by weight |
|---|---|
| C.I pigment yellow 74 | 20 |
| Styrene-methylstyrene-acrylic acid copolymer (acid value 160, weight average molecular weight 8,000, glass transition temperature 75° C.) | 6 |
| Glycerol | 15 |
| Isopropyl alcohol | 4 |
| Kneaded pigment material | 45 |

Next, the components indicated below were charged into an agitator, and agitation with heating was carried out for 2 hours at 95° C., thus preparing an undispersed pigment preparation.

| | Parts by weight |
|---|---|
| Above-mentioned kneaded pigment material | 45 |
| Neutralizer: triethanolamine | 3 |
| Ion exchange water | 55 |
| Undispersed pigment preparation | 103 |

Next, the undispersed pigment preparation was successively charged into a bead mill able to make the undispersed pigment preparation particles minute (having an ability to produce 50 nm organic pigment minute particles), and treatment was carried out over three passes, thus preparing a dispersed pigment preparation.

Next, the dispersed pigment preparation was adjusted to pH 8.5 using sodium hydroxide, centrifugation was carried out for 5 minutes at 25,000 G, and coarse particles were removed, thus preparing a readjusted dispersed pigment preparation. The readjusted dispersed preparation had a solid content of 26.0%, a pH of 8.3, and a pigment particle diameter (50% cumulative dispersed diameter) of no more than 100 nm.

Next, undermentioned mixture (1)-2 was charged into an agitator, and agitation was carried out for 5 hours at 90° C., thus crosslinking the resins in the dispersion, and hence obtaining a crosslinked preparation (hereinafter referred to as the 'crosslinking step'). The pH of the crosslinked preparation was approximately 8. Adjustment was further carried out with ion exchange water and potassium hydroxide such that the pigment solid component concentration became 10% and the pH became approximately 9, thus preparing pigment dispersion (1). In terms of charged-in theoretical amounts, the pigment dispersion (1) obtained had a styrene-methylstyrene-acrylic acid copolymer content of approximately 30 parts and a polyester type polyurethane resin content of approximately 30 parts per 100 parts of the pigment.

| Mixture (1)-2 | Parts by weight |
|---|---|
| Above-mentioned readjusted dispersed preparation | 103 |
| Polyester type polyurethane resin (solid content 30%) (acid value 50, neutralized with triethylamine) | 20 |
| Crosslinking agent: epoxy resin having 20% glycidyl ether backbone (epoxy equivalent 200) | 16 |
| Crosslinked preparation | 139 |

(Pigment Dispersion (2): Magenta)

Undermentioned mixture (2)-1 was charged into a pressurizing kneader, and kneading was carried out for 10 hours at room temperature, thus preparing a kneaded pigment material.

| Mixture (2)-1 | Parts by weight |
|---|---|
| C.I pigment violet 19 | 20 |
| Styrene-methylstyrene-acrylic acid copolymer (acid value 160, weight average molecular weight 8,000, glass transition temperature 75° C.) | 4 |
| Glycerol | 15 |
| Isopropyl alcohol | 4 |
| Kneaded pigment material | 43 |

An undispersed pigment preparation, a dispersed pigment preparation, and a readjusted dispersed preparation were prepared as with pigment dispersion (1). Next, undermentioned mixture (2)-2 was charged into an agitator, and agitation was carried out for 5 hours at 90° C., thus crosslinking the resins in the dispersion, and hence obtaining a crosslinked preparation. The pH of the crosslinked preparation was approximately 8. Adjustment was further carried out with ion exchange water and potassium hydroxide such that the pigment solid component concentration became 10% and the pH became approximately 9, thus preparing pigment dispersion (2). In terms of charged-in theoretical amounts, the pigment dispersion (2) obtained had a styrene-methylstyrene-acrylic acid copolymer content of approximately 20 parts and a polyether type polyurethane resin content of approximately 20 parts per 100 parts of the pigment.

| Mixture (2)-2 | Parts by weight |
|---|---|
| Above-mentioned readjusted dispersed preparation | 100 |
| Polyether type polyurethane resin (solid content 20%) (acid value 50, neutralized with triethylamine) | 20 |
| Crosslinking agent: epoxy resin having 20% glycidyl ether backbone (epoxy equivalent 200) | 16 |
| Crosslinked preparation | 136 |

(Pigment Dispersion (3): Cyan)

Undermentioned mixture (3)-1 was charged into a pressurizing kneader, and kneading was carried out for 10 hours at room temperature, thus preparing a kneaded pigment material.

| Mixture (3)-1 | Parts by weight |
|---|---|
| C.I pigment blue 15:3 | 20 |
| Styrene-methylstyrene-acrylic acid copolymer (acid value 160, weight average molecular weight 8,000, glass transition temperature 75° C.) | 8 |
| Glycerol | 15 |
| Isopropyl alcohol | 4 |
| Kneaded pigment material | 47 |

An undispersed pigment preparation, a dispersed pigment preparation, a readjusted dispersed preparation, and a crosslinked preparation were prepared as with pigment dispersion (1). Furthermore, undermentioned mixture (3)-2 was charged into an agitator, and agitation was carried out for 5 hours at 90° C., thus crosslinking the resins in the dispersion, and hence obtaining a crosslinked preparation. Adjustment was further carried out with ion exchange water and potassium hydroxide such that the pigment solid component concentration became 10% and the pH became approximately 9, thus preparing pigment dispersion (3). The pigment dispersion (3) obtained had a styrene-methylstyrene-acrylic acid copolymer content of approximately 40 parts and a polycarbonate type polyurethane resin content of approximately 40 parts per 100 parts of the pigment.

| Mixture (3)-2 | Parts by weight |
| --- | --- |
| Above-mentioned readjusted dispersed preparation | 100 |
| Polycarbonate type polyurethane resin (solid content 20%) (acid value 50, neutralized with triethylamine) | 40 |
| Crosslinking agent: epoxy resin having 20% glycidyl ether backbone (epoxy equivalent 200) | 16 |
| Crosslinked preparation | 156 |

(Pigment Dispersion (4): Yellow)

Pigment dispersion (4) was prepared as with pigment dispersion (2), except that the polyether type polyurethane resin of pigment dispersion (2) was changed to a polycarbonate type urethane resin, and the amount charged in was changed to 4 parts by weight, and moreover the pigment was changed to C.I pigment yellow 74. The pigment dispersion (4) obtained had a styrene-methylstyrene-acrylic acid copolymer content of approximately 20 parts and a polycarbonate type polyurethane resin content of approximately 20 parts per 100 parts of the pigment.

(Pigment Dispersion (5): Magenta)

Pigment dispersion (5) was prepared as with pigment dispersion (2), except that the amount charged in of the styrene-methylstyrene-acrylic acid copolymer of pigment dispersion (2) was changed to 8 parts by weight, and moreover the polyether type polyurethane resin was changed to a polyester type urethane resin. The pigment dispersion (5) obtained had a styrene-methylstyrene-acrylic acid copolymer content of approximately 40 parts and a polyester type polyurethane resin content of approximately 20 parts per 100 parts of the pigment.

(Pigment Dispersion (6): Cyan)

Pigment dispersion (6) was prepared as with pigment dispersion (3), except that the crosslinking agent of pigment dispersion (3) was changed to an oxazoline type crosslinking agent (oxazoline equivalent 200), and moreover the amount charged in was changed to 8 parts by weight. The pigment dispersion (6) obtained had a styrene-methylstyrene-acrylic acid copolymer content of approximately 20 parts and a polycarbonate type polyurethane resin content of approximately 20 parts per 100 parts of the pigment.

(Pigment Dispersions (7) to (9): Yellow, Magenta and Cyan)

An undispersed pigment preparation, a dispersed pigment preparation, and a readjusted dispersed preparation were prepared as with pigment dispersion (1), with the pigment of pigment dispersion (1) being changed to C.I pigment yellow 74, C.I pigment violet 19 or C.I pigment blue 15:3 respectively. In each case, without carrying out the crosslinking step, adjustment was carried out with ion exchange water and potassium hydroxide such that the pigment solid component concentration became 10% and the pH became approximately 9, whereby pigment dispersions (7) to (9) (yellow, magenta and cyan) were prepared.

Using the above pigment dispersions (1) to (6), ink compositions according to Working Examples B were prepared as in Table 4.

TABLE 4

| Working example | Yellow (1) Amount (%) | Magenta (1) Amount (%) | Cyan (1) Amount (%) | Yellow (2) Amount (%) | Magenta (2) Amount (%) | Cyan (2) Amount (%) | Yellow (3) Amount (%) | Magenta (3) Amount (%) | Cyan (3) Amount (%) |
| --- | --- | --- | --- | --- | --- | --- | --- | --- | --- |
| Gly | | | | | | | 15.50 | 15.00 | 12.50 |
| TEA | 0.90 | 0.90 | 0.90 | 0.90 | 0.90 | 0.90 | 0.90 | 0.90 | 0.90 |
| 1,2-HD | 7.00 | 10.00 | 0.00 | 10.00 | 0.00 | 7.00 | 3.00 | 3.00 | 3.00 |
| TEGmBE | 3.00 | 0.00 | 10.00 | 0.00 | 10.00 | 3.00 | 7.00 | 7.00 | 7.00 |
| BYK 348 | | | | | | | 0.30 | 0.30 | 0.30 |
| E1010 | | | | | | | 0.10 | 0.10 | 0.10 |
| Proxel XL2 | | | | | | | 0.30 | 0.30 | 0.30 |
| EDTA | | | | | | | 0.02 | 0.02 | 0.02 |
| Benzotriazole | | | | | | | 0.05 | 0.05 | 0.05 |
| Pure water | 59.10 | 69.10 | 74.10 | 59.10 | 69.10 | 74.10 | 72.93 | 73.43 | 6.23 |
| Pigment dispersion (1) | 30.00 | | | | | | 70.00 | | |
| Pigment dispersion (2) | | 20.00 | | | | | | 70.00 | |
| Pigment dispersion (3) | | | 15.00 | | | | | | 70.00 |
| Pigment dispersion (4) | | | | 30.00 | | | | | |
| Pigment dispersion (5) | | | | | 20.00 | | | | |
| Pigment dispersion (6) | | | | | | 15.00 | | | |
| Total | 100.00 | 100.00 | 100.00 | 100.00 | 100.00 | 100.00 | 100.00 | 100.00 | 100.00 |

Using the above pigment dispersions.(7) to (9), ink compositions according to comparative examples were prepared as in Table 5.

TABLE 5

| Comparative example | Yellow (4) Amount (%) | Magenta (4) Amount (%) | Cyan (4) Amount (%) | Yellow (5) Amount (%) | Magenta (5) Amount (%) | Cyan (5) Amount (%) |
|---|---|---|---|---|---|---|
| Gly | 15.50 | 15.00 | 12.50 | 15.50 | 15.00 | 12.50 |
| TEA | 0.90 | 0.90 | 0.90 | 0.90 | 0.90 | 0.90 |
| 1,2-HD | 7.00 | 10.00 | 0.00 | 3.00 | 3.00 | 3.00 |
| TEGmBE | 3.00 | 0.00 | 10.00 | 7.00 | 7.00 | 7.00 |
| BYK 348 | 0.30 | 0.30 | 0.30 | 0.30 | 0.30 | 0.30 |
| E1010 | 0.10 | 0.10 | 0.10 | 0.10 | 0.10 | 0.10 |
| Proxel XL2 | 0.30 | 0.30 | 0.30 | 0.30 | 0.30 | 0.30 |
| EDTA | 0.02 | 0.02 | 0.02 | 0.02 | 0.02 | 0.02 |
| Benzotriazole | 0.05 | 0.05 | 0.05 | 0.05 | 0.05 | 0.05 |
| Pure water | 42.93 | 53.43 | 61.23 | 2.93 | 3.43 | 6.23 |
| Pigment dispersion (7) | 30.00 | | | 70.00 | | |
| Pigment dispersion (8) | | 20.00 | | | 70.00 | |
| Pigment dispersion (9) | | | 15.00 | | | 70.00 |
| Total | 100.00 | 100.00 | 100.00 | 100.00 | 100.00 | 100.00 |

Experimental Examples

The ink compositions of the above working examples and comparative examples were filled into an ink jet printer (PM900C made by Seiko Epson Corporation), and printing was carried out at 80% duty (weight of ink 10 to 11 mg/inch$^2$) at 720×720 dpi on ink jet specialist paper (PM photographic paper made by Seiko Epson Corporation).

Here the 'duty' is the value calculated from the following formula.

Duty (%)=Actual number of dots printed/(vertical resolution×horizontal resolution) ×100

(In the formula, the 'actual number of dots printed' is the actual number of dots printed per unit area, and the 'vertical resolution' and the 'horizontal resolution' are the resolutions per unit area. 100% duty means the maximum weight of ink of a single color for the pixels.)

(Evaluation of Glossiness Bestowing Ability)

For each of the recorded articles, the glossiness was measured using a 'GP-200' (made by Murakami Color Research Laboratory) under conditions of 12 V, 50 W, an incident light beam aperture diameter of 1 mm, a reflected light beam aperture diameter of 1.5 mm, an ND10 filter, an angle of incidence of 45°, a tilt angle of 0°, and a 42.5 standard specular plate. The mean of the maximum value of the glossiness was calculated for the evaluated colors, and this was taken as the mean glossiness. The glossiness bestowing ability was evaluated as follows from the value of the mean glossiness.

AA:. Mean glossiness at least 50
A: Mean glossiness at least 40 but less than 50
B: Mean glossiness at least 30 but less than 40
C: Mean glossiness at least 20 but less than 30
D: Mean glossiness at least 10 but less than 20
E: Mean glossiness less than 10

(Evaluation of Bronzing)

The ink compositions of the above working examples were filled into a PM-900C printer (made by Seiko Epson Corporation), and solid patterns were printed on PM photographic paper (made by Seiko Epson Corporation). A light source was set up at an angle of 45° to the recorded surface, and the extent of bronzing upon observing from the position of specular reflection from the light source was judged using the following criteria.

A: Hardly any bronzing
B: Clearly some bronzing
C: Marked bronzing

The glossiness bestowing ability and bronzing evaluation results are shown in Table 6.

TABLE 6

| Working example | Yellow (1) | Magenta (1) | Cyan (1) | Yellow (2) | Magenta (2) | Cyan (2) | Yellow (3) | Magenta (3) | Cyan (3) |
|---|---|---|---|---|---|---|---|---|---|
| Glossiness | A | A | A | A | A | A | C | C | C |
| Bronzing | A | A | A | A | A | A | A | A | A |

| Comparative example | Yellow (4) | Magenta (4) | Cyan (4) | Yellow (5) | Magenta (5) | Cyan (5) |
|---|---|---|---|---|---|---|
| Glossiness | A | A | A | C | C | C |
| Bronzing | B | B | B | B | B | B |

As shown in Table 6, it was found that the inks according to Working Examples B give better glossiness and bronzing resistance than the inks according to the comparative examples.

Working Examples C

Pigment dispersions (1) to (6) according to Working Examples C, and pigment dispersions (7) to (9) according to comparative examples were prepared as follows.

(Pigment Dispersion (1): Yellow)

Undermentioned mixture (1)-1 was charged into a pressurizing kneader, and kneading was carried out for 10 hours at room temperature, thus preparing a kneaded pigment material.

| Mixture (1)-1 | Parts by weight |
|---|---|
| C.I pigment yellow 74 | 20 |
| Styrene-methylstyrene-acrylic acid copolymer (acid value 240, weight average molecular weight 16,500, glass transition temperature 100° C.) | 3 |
| Glycerol | 15 |
| Isopropyl alcohol | 4 |
| Kneaded pigment material | 42 |

Next, the components indicated below were charged into an agitator, and agitation with heating was carried out for 2 hours at 95° C., thus preparing an undispersed pigment preparation.

| | Parts by weight |
|---|---|
| Above-mentioned kneaded pigment material | 42 |
| Neutralizer: triethanolamine | 3 |
| Ion exchange water | 55 |
| Undispersed pigment preparation | 100 |

Next, the undispersed pigment preparation was successively charged into a bead mill able to make the undispersed pigment preparation particles minute (having an ability to produce 50 nm organic pigment minute particles), and treatment was carried out over three passes, thus preparing a dispersed pigment preparation.

Next, the dispersed pigment preparation was adjusted to pH 8.5 using sodium hydroxide, centrifugation was carried out for 5 minutes at 25,000 G, and coarse particles were removed, thus preparing a readjusted dispersed pigment preparation. The readjusted dispersed preparation had a solid content of 23.0%, a pH of 8.3, and a pigment particle diameter (50% cumulative dispersed diameter) of no more than 100 nm.

Next, undermentioned mixture (1)-2 was charged into an agitator, and agitation was carried out for 5 hours at 90° C., thus crosslinking the resins in the dispersion, and hence obtaining a crosslinked preparation (hereinafter referred to as the 'crosslinking step'). The pH of the crosslinked preparation was approximately 8. Adjustment was further carried out with ion exchange water and potassium hydroxide such that the pigment solid component concentration became 10% and the pH became approximately 9, thus preparing pigment dispersion (1). In terms of charged-in theoretical amounts, the pigment dispersion (1) obtained had a styrene-methylstyrene-acrylic acid copolymer content of approximately 15 parts and a polyester type polyurethane resin content of approximately 15 parts per 100 parts of the pigment.

| Mixture (1)-2 | Parts by weight |
|---|---|
| Above-mentioned readjusted dispersed preparation | 100 |
| Polyester type polyurethane resin (solid content 30%) (acid value 50, neutralized with triethylamine) | 10 |
| Crosslinking agent: epoxy resin having 20% glycidyl ether backbone (epoxy equivalent 200) | 8 |
| Crosslinked preparation | 118 |

(Pigment Dispersion (2): Magenta)

Undermentioned mixture (2)-1 was charged into a pressurizing kneader, and kneading was carried out for 10 hours at room temperature, thus preparing a kneaded pigment material.

| Mixture (2)-1 | Parts by weight |
|---|---|
| C.I pigment violet 19 | 20 |
| Styrene-methylstyrene-acrylic acid copolymer (acid value 240, weight average molecular weight 16,500, glass transition temperature 100° C.) | 2 |
| Glycerol | 15 |
| Isopropyl alcohol | 4 |
| Kneaded pigment material | 41 |

An undispersed pigment preparation, a dispersed pigment preparation, and a readjusted dispersed preparation were prepared as with pigment dispersion (1). Next, undermentioned mixture (2)-2 was charged into an agitator, and agitation was carried out for 5 hours at 90° C., thus crosslinking the resins in the dispersion, and hence obtaining a crosslinked preparation. The pH of the crosslinked preparation was approximately 8. Adjustment was further carried out with ion exchange water and potassium hydroxide such that the pigment solid component concentration became 10% and the pH became approximately 9, thus preparing pigment dispersion (2). In terms of charged-in theoretical amounts, the pigment dispersion (2) obtained had a styrene-methylstyrene-acrylic acid copolymer content of approximately 10 parts and a polyether type polyurethane resin content of approximately 10 parts per 100 parts of the pigment.

| Mixture (2)-2 | Parts by weight |
|---|---|
| Above-mentioned readjusted dispersed preparation | 100 |
| Polyether type polyurethane resin (solid content 20%) (acid value 50, neutralized with triethylamine) | 10 |
| Crosslinking agent: epoxy resin having 20% glycidyl ether backbone (epoxy equivalent 200) | 8 |
| Crosslinked preparation | 118 |

(Pigment Dispersion (3): Cyan)

Undermentioned mixture (3)-1 was charged into a pressurizing kneader, and kneading was carried out for 10 hours at room temperature, thus preparing a kneaded pigment material.

| Mixture (3)-1 | Parts by weight |
|---|---|
| C.I pigment blue 15:3 | 20 |
| Styrene-methylstyrene-acrylic acid copolymer (acid value 240, weight average molecular weight 16,500, glass transition temperature 100° C.) | 4 |
| Glycerol | 15 |
| Isopropyl alcohol | 4 |
| Kneaded pigment material | 43 |

An undispersed pigment preparation, a dispersed pigment preparation, a readjusted dispersed preparation, and a crosslinked preparation were prepared as with pigment dispersion (1). Furthermore, undermentioned mixture (3)-2 was charged into an agitator, and agitation was carried out for 5 hours at 90° C., thus crosslinking the resins in the dispersion, and hence obtaining a crosslinked preparation. Adjustment was further carried out with ion exchange water and potassium hydroxide such that the pigment solid component concentration became 10% and the pH became approximately 9, thus preparing pigment dispersion (3). The pigment dispersion (3) obtained had a styrene-methylstyrene-acrylic acid copolymer content of approximately 20 parts and a polycarbonate type polyurethane resin content of approximately 20 parts per 100 parts of the pigment.

| Mixture (3)-2 | Parts by weight |
|---|---|
| Above-mentioned readjusted dispersed preparation | 100 |
| Polycarbonate type polyurethane resin (solid content 20%) (acid value 50, neutralized with triethylamine) | 20 |
| Crosslinking agent: epoxy resin having 20% glycidyl ether backbone (epoxy equivalent 200) | 8 |
| Crosslinked preparation | 128 |

(Pigment Dispersion (4): Yellow)

Pigment dispersion (4) was prepared as with pigment dispersion (2), except that the polyether type polyurethane resin of pigment dispersion (2) was changed to a polycarbonate type urethane resin, and the amount charged in was changed to 4 parts by weight, and moreover the pigment was changed to C.I pigment yellow 74. The pigment dispersion (4) obtained had a styrene-methylstyrene-acrylic acid copolymer content of approximately 10 parts and a polycarbonate type polyurethane resin content of approximately 20 parts per 100 parts of the pigment.

(Pigment Dispersion (5): Magenta)

Pigment dispersion (5) was prepared as with pigment dispersion (2), except that the amount charged in of the styrene-methylstyrene-acrylic acid copolymer of pigment dispersion (2) was changed to 4 parts by weight, and moreover the polyether type polyurethane resin was changed to a polyester type urethane resin. The pigment dispersion (5) obtained had a styrene-methylstyrene-acrylic acid copolymer content of approximately 20 parts and a polyester type urethane resin content of approximately 10 parts per 100 parts of the pigment.

(Pigment Dispersion (6): Cyan)

Pigment dispersion (6) was prepared as with pigment dispersion (3), except that the polycarbonate type polyurethane resin of pigment dispersion (3) was changed to a polyether type urethane, and the crosslinking agent was changed to an oxazoline type crosslinking agent (oxazoline equivalent 200), and moreover the amount charged in was changed to 4 parts by weight. The pigment dispersion (6) obtained had a styrene-methylstyrene-acrylic acid copolymer content of approximately 20 parts and a polyether type polyurethane resin content of approximately 20 parts per 100 parts of the pigment.

(Pigment Dispersions (7) to (9): Yellow, Magenta and Cyan)

An undispersed pigment preparation, a dispersed pigment preparation, and a readjusted dispersed preparation were prepared as with pigment dispersion (1), with the pigment of pigment dispersion (1) being changed to C.I pigment yellow 74, C.I pigment violet 19 or C.I pigment blue 15:3 respectively. In each case, without carrying out the crosslinking step, adjustment was carried out with ion exchange water and potassium hydroxide such that the pigment solid component concentration became 10% and the pH became approximately 9, whereby pigment dispersions (7) to (9) (yellow, magenta and cyan) were prepared.

Using the above pigment dispersions (1) to (6), ink compositions according to Working Examples C were prepared as in Table 7.

TABLE 7

| Working example | Yellow (1) Amount (%) | Magenta (1) Amount (%) | Cyan (1) Amount (%) | Yellow (2) Amount (%) | Magenta (2) Amount (%) | Cyan (2) Amount (%) | Yellow (3) Amount (%) | Magenta (3) Amount (%) | Cyan (3) Amount (%) |
|---|---|---|---|---|---|---|---|---|---|
| Gly | | | | | | | 15.50 | 15.00 | 12.50 |
| TEA | 0.90 | 0.90 | 0.90 | 0.90 | 0.90 | 0.90 | 0.90 | 0.90 | 0.90 |
| 1,2-HD | 7.00 | 10.00 | 0.00 | 10.00 | 0.00 | 7.00 | 3.00 | 3.00 | 3.00 |
| TEGmBE | 3.00 | 0.00 | 10.00 | 0.00 | 10.00 | 3.00 | 7.00 | 7.00 | 7.00 |
| BYK 348 | | | | | | | 0.30 | 0.30 | 0.30 |
| E1010 | | | | | | | 0.10 | 0.10 | 0.10 |
| Proxel XL2 | | | | | | | 0.30 | 0.30 | 0.30 |
| EDTA | | | | | | | 0.02 | 0.02 | 0.02 |
| Benzotriazole | | | | | | | 0.05 | 0.05 | 0.05 |
| Pure water | 59.10 | 69.10 | 74.10 | 59.10 | 69.10 | 74.10 | 72.93 | 73.43 | 6.23 |
| Pigment dispersion (1) | 30.00 | | | | | | 70.00 | | |
| Pigment dispersion (2) | | 20.00 | | | | | | 70.00 | |

TABLE 7-continued

|  |  |  |  |  |  |  |  |  |  |
|---|---|---|---|---|---|---|---|---|---|
| Pigment dispersion (3) |  |  | 15.00 |  |  |  |  |  | 70.00 |
| Pigment dispersion (4) |  |  |  | 30.00 |  |  |  |  |  |
| Pigment dispersion (5) |  |  |  |  | 20.00 |  |  |  |  |
| Pigment dispersion (6) |  |  |  |  |  |  | 15.00 |  |  |
| Total | 100.00 | 100.00 | 100.00 | 100.00 | 100.00 | 100.00 | 100.00 | 100.00 | 100.00 |

Using the above pigment dispersions (7) to (9), ink compositions according to comparative examples were prepared as in Table 8.

TABLE 8

| Comparative example | Yellow (4) Amount (%) | Magenta (4) Amount (%) | Cyan (4) Amount (%) | Yellow (5) Amount (%) | Magenta (5) Amount (%) | Cyan (5) Amount (%) |
|---|---|---|---|---|---|---|
| Gly | 15.50 | 15.00 | 12.50 | 15.50 | 15.00 | 12.50 |
| TEA | 0.90 | 0.90 | 0.90 | 0.90 | 0.90 | 0.90 |
| 1,2-HD | 7.00 | 10.00 | 0.00 | 3.00 | 3.00 | 3.00 |
| TEGmBE | 3.00 | 0.00 | 10.00 | 7.00 | 7.00 | 7.00 |
| BYK 348 | 0.30 | 0.30 | 0.30 | 0.30 | 0.30 | 0.30 |
| E1010 | 0.10 | 0.10 | 0.10 | 0.10 | 0.10 | 0.10 |
| Proxel XL2 | 0.30 | 0.30 | 0.30 | 0.30 | 0.30 | 0.30 |
| EDTA | 0.02 | 0.02 | 0.02 | 0.02 | 0.02 | 0.02 |
| Benzotriazole | 0.05 | 0.05 | 0.05 | 0.05 | 0.05 | 0.05 |
| Pure water | 42.93 | 53.43 | 61.23 | 2.93 | 3.43 | 6.23 |
| Pigment dispersion (7) | 30.00 |  |  | 70.00 |  |  |
| Pigment dispersion (8) |  | 20.00 |  |  | 70.00 |  |
| Pigment dispersion (9) |  |  | 15.00 |  |  | 70.00 |
| Total | 100.00 | 100.00 | 100.00 | 100.00 | 100.00 | 100.00 |

Experimental Examples

The ink compositions of the above Working Examples and comparative examples were filled into an ink jet printer (PM900C made by Seiko Epson Corporation), and printing was carried out at 80% duty (weight of ink 10 to 11 mg/inch$^2$) at 720×720 dpi on ink jet specialist paper (PM photographic paper made by Seiko Epson Corporation).

Here the 'duty' is the value calculated from the following formula.

Duty (%)=Actual number of dots printed/(vertical resolution×horizontal resolution) ×100

(In the formula, the 'actual number of dots printed' is the actual number of dots printed per unit area, and the 'vertical resolution' and the 'horizontal resolution' are the resolutions per unit area. 100% duty means the maximum weight of ink of a single color for the pixels.)

(Evaluation of Glossiness Bestowing Ability)

For each of the recorded articles, the glossiness was measured using a 'GP-200' (made by Murakami Color Research Laboratory) under conditions of 12 V, 50 W, an incident light beam aperture diameter of 1 mm, a reflected light beam aperture diameter of 1.5 mm, an ND10 filter, an angle of incidence of 45°, a tilt angle of 0°, and a 42.5 standard specular plate. The mean of the maximum value of the glossiness was calculated for the evaluated colors, and this was taken as the mean glossiness. The glossiness bestowing ability was evaluated as follows from the value of the mean glossiness.

AA: Mean glossiness at least 50
A: Mean glossiness at least 40 but less than 50
B: Mean glossiness at least 30 but less than 40
C: Mean glossiness at least 20 but less than 30
D: Mean glossiness at least 10 but less than 20
E: Mean glossiness less than 10

(Evaluation of Storage Stability)

The ink compositions prepared using the dispersions were each left for one month at 60° C., and the difference in viscosity to the initial product was examined. A Digital Viscomate Model VM-100A (made by Yamaichi Electronics) was used as the measuring apparatus, and the measurement condition was made to be 20° C. The storage stability was evaluated using the following criteria.

A: Viscosity change not more than 5%.

B: Viscosity change more than 5% but not more than 10% The glossiness bestowing ability and storage stability evaluation results are shown in Table 9.

TABLE 9

| Working example | Yellow (1) | Magenta (1) | Cyan (1) | Yellow (2) | Magenta (2) | Cyan (2) | Yellow (3) | Magenta (3) | Cyan (3) |
|---|---|---|---|---|---|---|---|---|---|
| Glossiness | A | A | A | A | A | A | C | C | C |
| Storage stability | A | A | A | A | A | A | A | A | A |

| Comparative example | Yellow (4) | Magenta (4) | Cyan (4) | Yellow (5) | Magenta (5) | Cyan (5) |
|---|---|---|---|---|---|---|
| Glossiness | A | A | A | C | C | C |
| Storage stability | B | B | B | B | B | B |

As shown in Table 9, it was found that the inks according to Working Examples C give better glossiness and storage stability than the inks according to the comparative examples.

INDUSTRIAL APPLICABILITY

According to the present invention, there can be provided a pigment dispersion that enables preparation of an ink composition that has excellent storage stability and is for forming images that have excellent glossiness and for which bronzing is prevented, and an ink composition and an ink set that enable excellent glossiness, bronzing prevention, and ink composition storage stability to be realized.

Moreover, the pigment dispersion and the ink composition of the present invention are also excellent in terms of discharge stability and clogging prevention, and moreover high image quality can be realized.

We claim:

1. A pigment dispersion, comprising at least a pigment, an aqueous medium, a copolymer resin between a hydrophobic monomer and a hydrophilic monomer, and a urethane resin, wherein said copolymer resin has an acid value in a range of 50 to 320, and
    wherein said urethane resin has an acid value in a range of 10 to 300.

2. The pigment dispersion according to claim 1, wherein said copolymer resin and said urethane resin have a weight ratio (former/latter) in a range of 1/2 to 2/1.

3. The pigment dispersion according to claim 1, wherein the content of said copolymer resin is in a range of 10 to 50 parts by weight per 100 parts by weight of said pigment, and the content of said urethane resin is in a range of 10 to 40 parts by weight per 100 parts by weight of said pigment.

4. The pigment dispersion according to claim 3, wherein said copolymer resin and said urethane resin have a weight ratio (former/latter) in a range of 1/2 to 2/1.

5. The pigment dispersion according to claim 1, wherein said copolymer resin is at least one of a styrene-(meth)acrylic acid copolymer resin, a styrene-methylstyrene-(meth)acrylic acid copolymer resin, a styrene-maleic acid copolymer resin, a (meth)acrylic acid-(meth)acrylic acid ester copolymer resin, and a styrene-(meth)acrylic acid-(meth)acrylic acid ester copolymer resin.

6. The pigment dispersion according to claim 1, wherein said urethane resin has urethane linkages and/or amide linkages, and acidic groups.

7. The pigment dispersion according to claim 1, wherein the weight ratio between a solid component of said pigment and non-pigment solid components (former/latter) is in a range of 100/20 to 100/80.

8. The pigment dispersion according to claim 2, wherein the content of said copolymer resin is in a range of 10 to 50 parts by weight per 100 parts by weight of said pigment, and the content of said urethane resin is in a range of 10 to 40 parts by weight per 100 parts by weight of said pigment.

9. The pigment dispersion according to claim 2, wherein said copolymer resin has an acid value in a range of 50 to 320, and said urethane resin has an acid value in a range of 10 to 300.

10. The pigment dispersion according to claim 1, wherein said copolymer resin has a weight average molecular weight (Mw) in a range of 2,000 to 30,000, and said urethane resin has a weight average molecular weight (Mw) in a range of 100 to 200,000.

11. The pigment dispersion according to claim 1, wherein said copolymer resin has a glass transition temperature (Tg; measured in accordance with JIS K6900) of at least 30° C., and said urethane resin has a glass transition temperature (Tg; measured in accordance with JIS K6900) in a range of −50 to 200° C.

12. The pigment dispersion according claim 1, wherein said copolymer resin has a maximum particle diameter of not more than 0.3 μm, and said urethane resin has a maximum particle diameter of not more than 0.3 μm.

13. The pigment dispersion according to claim 1, wherein said pigment is an organic pigment.

14. The pigment dispersion according to claim 1, wherein said pigment is a pigment that has been subjected to kneading treatment.

15. The pigment dispersion according to claim 1, wherein said pigment is a pigment that has been prepared using a bead mill or an impact jet mill.

16. The pigment dispersion according to claim 1, wherein the pigment dispersion has been subjected to ion exchange treatment or ultra-filtration.

17. The pigment dispersion according to claim 1, wherein an epoxy resin having a glycidyl ether as a backbone thereof, or a resin having oxazoline groups has been added to the pigment dispersion as a crosslinking agent.

18. The pigment dispersion according to claim 17, wherein said crosslinking agent is a resin that reacts with carboxyl groups.

19. The pigment dispersion according to claim 17, wherein the amount added of said crosslinking agent is in a range of 1 to 50 wt% relative to said urethane resin.

20. The pigment dispersion according to claim 19, wherein said urethane resin has a weight average molecular weight (Mw) after reaction with said crosslinking agent of at least 10,000.

21. The pigment dispersion according to claim 17, wherein the amount added of said crosslinking agent is such that an effective solid component weight ratio (weight of crosslinking agent/(total weight of copolymer resin between hydrophobic monomer and hydrophilic monomer, and urethane resin)) is in a range of 0.5/100 to 50/100.

22. An ink composition, containing at least the pigment dispersion according to claim 1, and an aqueous medium.

23. The ink composition according to claim 22, wherein said aqueous medium contains a penetrating solvent, a wetting solvent, and/or a surfactant.

24. The ink composition according to claim 23, wherein said penetrating solvent is an alkanediol and/or a glycol ether.

25. The ink composition according to claim 23, wherein said wetting solvent is a polyhydric alcohol.

26. The ink composition according to claim 23, wherein said surfactant is acetylenic glycol and/or a polysiloxane.

27. The ink composition according to claim 22, characterized by further containing an alkanolamine or an alkylamine as a pH adjuster.

28. The ink composition according to claim 22, wherein the ink composition has a pH of at least 8.0, a pigment maximum particle diameter of not more than 0.3 µm, and a pigment 50% cumulative dispersed diameter of not more than 0.15 µm.

29. The ink composition according to claim 22, wherein the content of said pigment is not more than 10 wt% of the ink composition.

30. An ink set, comprising at least the ink composition according to claim 22.

31. A method of manufacturing a pigment dispersion according to claim 1, comprising:
   a pretreatment step of making a particle diameter of the pigment minute and uniform through kneading treatment or chipping treatment;
   a dispersion step of adding the copolymer resin between the hydrophobic monomer and the hydrophilic monomer, and then dispersing the pigment using a bead mill or an impact jet mill; and
   an after-treatment step of further adding the urethane resin and a crosslinking agent and carrying out crosslinking treatment.

32. A pigment dispersion, comprising at least a pigment, an aqueous medium, a copolymer resin between a hydrophobic monomer and a hydrophilic monomer, and a urethane resin,
   wherein said urethane resin has urethane linkages and/or amide linkages, and acidic groups.

33. A pigment dispersion, comprising at least a pigment, an aqueous medium, a copolymer resin between a hydrophobic monomer and a hydrophilic monomer, and a urethane resin,
   wherein an epoxy resin having a glycidyl ether as a backbone thereof, or a resin having oxazoline groups has been added to the pigment dispersion as a crosslinking agent, and
   wherein said crosslinking agent is a resin that reacts with carboxyl groups.

* * * * *